(12) United States Patent
Daniel

(10) Patent No.: US 7,358,458 B2
(45) Date of Patent: Apr. 15, 2008

(54) METHODS AND APPARATUS FOR TACTILE COMMUNICATION IN AN ARC PROCESSING SYSTEM

(75) Inventor: Joseph Allen Daniel, Sagamore Hills, OH (US)

(73) Assignee: Lincoln Global, Inc., City of Industry, CA (US)

( * ) Notice: Subject to any disclaimer, the term of this patent is extended or adjusted under 35 U.S.C. 154(b) by 338 days.

(21) Appl. No.: 11/042,867

(22) Filed: Jan. 25, 2005

(65) Prior Publication Data

US 2006/0163228 A1 Jul. 27, 2006

(51) Int. Cl.
*B23K 9/095* (2006.01)

(52) U.S. Cl. .................................. 219/130.01
(58) Field of Classification Search ........... 219/130.01, 219/132, 137.31, 121.48, 136, 137 PS; 340/407.1; 341/27
See application file for complete search history.

(56) References Cited

U.S. PATENT DOCUMENTS

| | | | | |
|---|---|---|---|---|
| 1,984,809 A | * | 12/1934 | Re Qua | 219/137 PS |
| 2,191,516 A | * | 2/1940 | Caldwell | 340/407.1 |
| 2,361,918 A | * | 11/1944 | Baird | 314/9 |
| 4,216,368 A | * | 8/1980 | Delay | 219/132 |
| 4,614,857 A | * | 9/1986 | Webb et al. | 219/136 |
| 4,918,438 A | * | 4/1990 | Yamasaki | 340/407.1 |
| 4,954,690 A | | 9/1990 | Kensrue | |
| 4,958,541 A | * | 9/1990 | Annis et al. | 81/479 |
| 5,357,076 A | | 10/1994 | Blankenship | |
| 5,477,133 A | * | 12/1995 | Earle | 324/72.5 |
| 5,847,354 A | | 12/1998 | Daniel | |
| 6,084,195 A | | 7/2000 | Swaggerty et al. | |
| 6,184,868 B1 | | 2/2001 | Shahoian et al. | |
| 6,420,680 B1 | | 7/2002 | Samodell | |
| 6,570,129 B1 | | 5/2003 | Samodell | |
| 6,627,848 B2 | | 9/2003 | Boehnlein | |
| 6,697,044 B2 | | 2/2004 | Shahoian et al. | |
| 6,705,563 B2 | | 3/2004 | Luo et al. | |
| 6,759,623 B2 | | 7/2004 | Enyedy | |
| 6,930,280 B2 | * | 8/2005 | Zauner et al. | 219/132 |

FOREIGN PATENT DOCUMENTS

DE 2605322 A * 8/1977
WO PCT WO 00/21071 4/2000

OTHER PUBLICATIONS

Immersion Corporation, product page obtained from internet www.immersion.com on Aug. 13, 2004 total pp. 5.

* cited by examiner

*Primary Examiner*—Clifford C. Shaw
(74) *Attorney, Agent, or Firm*—Fay Sharpe LLP

(57) ABSTRACT

Systems and methods are presented for tactile communication with an operator in an arc processing system, in which a tactile device is mechanically coupled with a handheld torch to provide tactile messages to the operator according to information related to the system or to an arc processing operation being performed.

19 Claims, 9 Drawing Sheets

METHODS AND APPARATUS FOR TACTILE COMMUNICATION IN AN ARC PROCESSING SYSTEM

FIELD OF THE INVENTION

The present invention relates generally to welding and plasma cutting equipment and other arc processing system, and more particularly to apparatus and methods for tactile communication with an operator of such a system.

INCORPORATION BY REFERENCE

The following patents are hereby incorporated by reference as background information with respect to arc processing systems and tactile actuators: Daniel U.S. Pat. No. 5,847,354, Samodell U.S. Pat. Nos. 6,570,129 and 6,420,680, Blankenship U.S. Pat. No. 5,357,076, Enyedy U.S. Pat. No. 6,759,623, Boehnlein U.S. Pat. No. 6,627,848, Luo U.S. Pat. No. 6,705,563, Swaggerty U.S. Pat. No. 6,084,195, Easterday U.S. Pat. No. 6,163,005, Kensrue U.S. Pat. No. 4,954,690, and Shahoian U.S. Pat. Nos. 6,697,044 and 6,185,868.

BACKGROUND OF THE INVENTION

Arc processing systems are machines which may be used to generate and apply electrical arcs for operating on workpieces. Examples of arc processing systems include welding systems and plasma cutting systems. Electric welders are employed in a variety of field applications, in which electric power is applied to a gap in a welding circuit between a workpiece to be welded and an electrode. In many welding applications, an operator manually directs electrical power from a welding system power source to a weld operation using a handheld welding torch that is coupled through a cable to the welding system power source or power supply. The handheld welding torch may also provide consumable welding wire from a wire feeder to the weld operation in a controlled fashion, where the wire feeder may be separate from or integral to the power source. In the case of a separate wire feeder, the torch cable may be connected between the torch and the wire feeder, with the wire feeder being connected to the power source through a second cable in the welding system, wherein the torch cable accommodates power connections and the transfer of the welding wire to the handheld torch. In addition, process gas may be provided to the welding operation through the torch and torch cable, and cooling water may be directed through the torch via a coolant supply in the welder and passageways in the torch cable.

Plasma arc cutters or plasma cutting systems are used for cutting various structures or workpieces, wherein an operator typically directs a cutting arc and process plasma to the workpiece using a handheld plasma cutting torch. In this case, the handheld torch is coupled by a cable to a source of electrical power used to generate an electrical cutting arc in the torch, wherein one or more process gases such as shop air, nitrogen, argon, oxygen, etc. are passed through a constricted opening proximate the arc between a nozzle and an energized electrode of the torch tip. The temperature of the gas is elevated, causing ionization of the process gas to create process plasma. The restricted opening causes the gas and plasma to travel at a high speed, wherein some of the gas/plasma cuts through the molten metal of the workpiece and the remainder is directed around the perimeter of the cutting area to shield the cut.

During an arc processing operation, it may be desirable to convey certain information to an operator of an arc processing system. For instance, in an arc welding or plasma arc cutting operation, the operator of a handheld welding or cutting torch may want to know the operating condition of the system power source, wire feeder, or other system component. In addition, the operator may need to know the status or other information relating to the welding or cutting operation. While this information may be displayed visually on a user interface or control panel of the welder or plasma cutter power source enclosure, the operator is typically focused on the arc processing operation, and cannot be expected to view the power source to obtain such information. In addition, welding operators typically wear welding masks or helmets that may inhibit the ability of the operator to read a visual display without the need to first remove or raise the helmet. Furthermore, in some field welding or cutting applications, the power source may be physically remote from the operator, in which case visual display of the information on the power source is not even within sight of the operator. Audio communication may alternatively be used to alert the operator to process or system conditions. However, the typical operating environment for such arc processing equipment is generally not amenable to using alarms or other audible annunciators to provide such information to the operator. For instance, high ambient noise levels are common in many industrial sites, wherein audible signals would need to be relatively loud for an operator to hear them. Also, where multiple operators are performing arc processing operations within a small area, an audible message could be incorrectly interpreted by several operators. Accordingly, there remains a need for improved systems and techniques for conveying information to an operator of an arc processing system.

SUMMARY OF INVENTION

A summary of one or more aspects of the invention is now presented in order to facilitate a basic understanding thereof. This summary is not an extensive overview of the invention, and is intended neither to identify key or critical elements of the invention, nor to delineate the scope of the invention. Rather, the primary purpose of the summary is to present some concepts of the invention in a simplified form prior to the more detailed description that is presented hereinafter.

The present invention relates to welding, plasma cutting, and other forms of arc processing equipment and systems, wherein tactile communication is employed to provide system or process related information to an operator using one or more tactile actuators or tactile devices mechanically coupled with a torch to provide a tactile message to the operator according to information from an arc processing device, without the shortcomings associated with visual and/or audio communication techniques. In this regard, the invention may be advantageously employed to facilitate reliable communication without forcing a welding or cutting operator to remove a welding helmet or even to divert his or her attention away from an arc processing operation. In addition, the use of tactile communication reduces or eliminates the possibility of the operator of one system incorrectly responding to information associated with a second system.

In accordance with one aspect of the invention, an electric arc processing system is provided, which may be a welding system, a plasma cutting system, or any other type of system in which electrical arcs are created and employed to operate on a workpiece. The system comprises an arc processing device, such as a welder, plasma cutter, etc., having a power source to provide electrical power for an arc processing operation, as well as a torch coupled with the arc processing device to provide power from the power source to the operation. The system further comprises one or more tactile devices such as a vibration motor, solenoid, or other type of device capable of providing tactile actuation of a mechanical structure. The tactile device may be located anywhere in the system in a mechanically coupled relationship with respect to the torch, such that energizing or otherwise enabling the tactile device causes tactile actuation of the torch for communicating with or otherwise conveying information to an operator in contact with the torch. For example, the tactile device may be located within the torch handle, within a cable between the torch and the arc processing device, or may even be located in the arc processing device (e.g., in a power source or wire feeder housing, etc.) while being mechanically coupled to the cable.

The tactile device has an activating input which is responsive to a signal to cause tactile actuation of the torch according to the signal. In one example, the arc processing device provides an electrical signal to the activating input of the tactile device, which then provides a corresponding tactile message to the operator of the torch. The arc processing device provides the signal to the tactile device in response to a selected arc processing condition, for example, according to a condition associated the arc processing device and/or a condition associated with the arc processing operation. In a welding or plasma cutting example, the signal may be one or more electrical signals generated by the power source, which can be provided to the tactile device through the torch cable or may be transmitted to the torch by a wireless or other communications channel or link, wherein the arc processing device may comprise a transmitter to transmit the signal to the tactile device. In the case of welding systems, moreover, the signal can be generated in a wire feeder, which may be integrated in a single housing with the power source, or may be housed in a separate enclosure.

The tactile communication may be in any suitable form to provide information to the torch operator. In one example, the tactile messages may be constructed as one or more distinct signals, wherein the arc processing device provides a plurality of electrical signals to the tactile device. The tactile device provides a tactile message in the form of a corresponding plurality of tactile signals to the operator, where the electrical signals and tactile signals are formed into multiple-signal patterns having a plurality of distinct signals in accordance with a communication protocol.

Another aspect of the invention provides a handheld torch apparatus for use in performing an arc processing operation, which comprises a torch handle, a cable coupled to the torch handle for connecting the torch apparatus to an arc processing device, and one or more tactile devices mechanically coupled with said torch handle, wherein the tactile device has an activating input responsive to a signal and is adapted to provide a tactile message to an operator of the torch apparatus according to the signal. Any suitable tactile actuation device may be used, such as a vibration motor, solenoid, etc., which may be located anywhere in the torch assembly or apparatus, for example, in the torch handle or in the torch cable.

Yet another aspect of the invention provides a method of conveying information in an arc processing system from an arc processing device of the system to an operator. The method comprises generating a signal in the arc processing device according to information related to the arc processing device and/or to an arc processing operation being performed, and providing the signal to a tactile device that is mechanically coupled to a handheld torch in the system. The method further includes generating a tactile message to an operator of the handheld torch according to the signal. In one implementation, a plurality of electrical signals are generated that are formed into a multiple-signal pattern according to a communication protocol, with a plurality of tactile signals being generated in the form of a corresponding multiple-signal tactile pattern according to the protocol, where the multiple-signal pattern may comprise a plurality of distinct signals.

BRIEF DESCRIPTION OF THE DRAWINGS

The following description and drawings set forth in detail certain illustrative implementations of the invention. These are indicative of but a few of the various ways in which the principles of the invention may be employed. Other objects, advantages and novel features of the invention will become apparent from the following detailed description of the invention when considered in conjunction with the drawings, in which.

DETAILED DESCRIPTION OF THE INVENTION

Figure 1A:
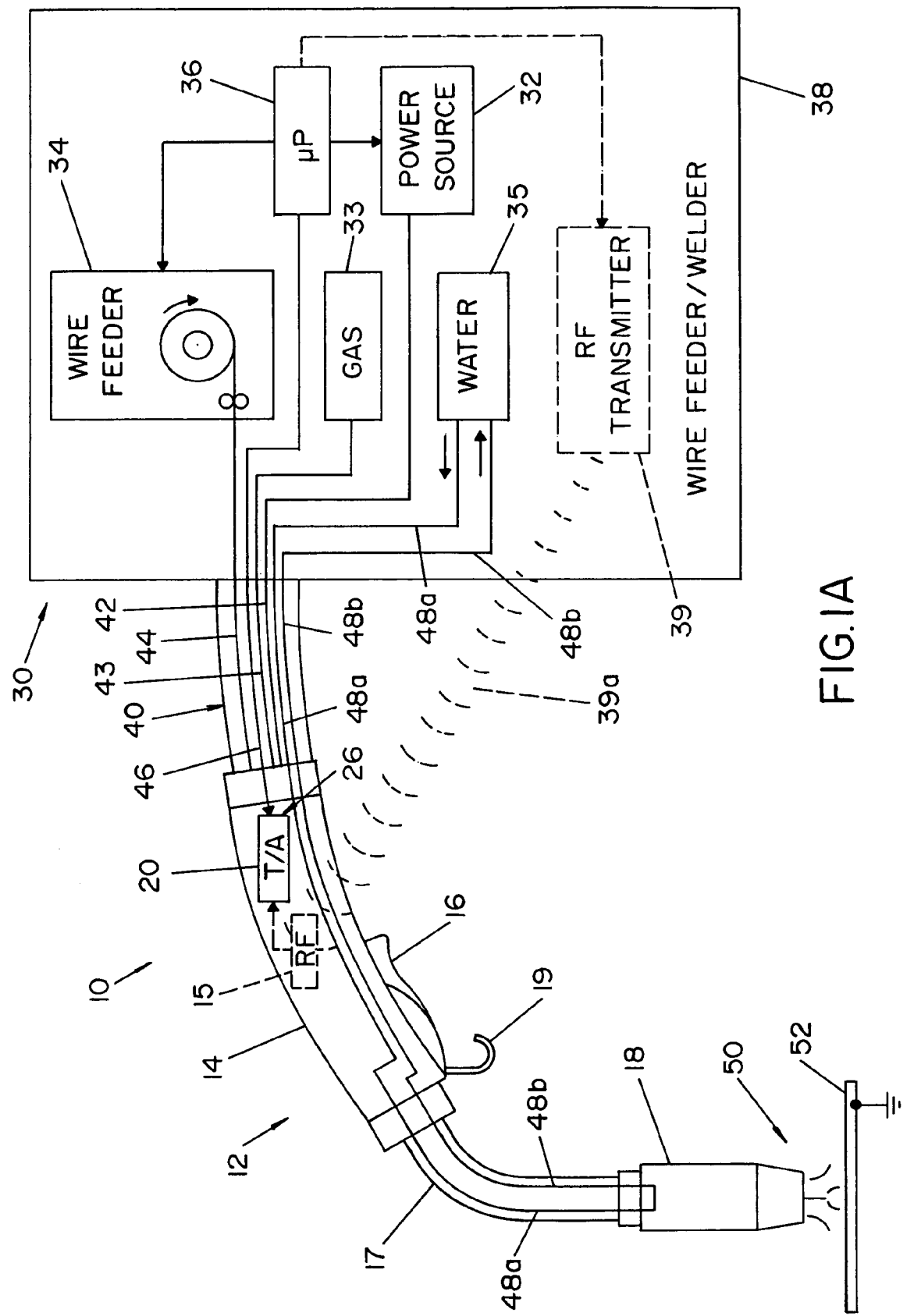
FIG. 1A is a simplified schematic view illustrating an exemplary electric arc welding system with a handheld torch apparatus and a tactile actuator device located in the torch handle in accordance with one or more aspects of the present invention.

One or more embodiments or implementations of the present invention will now be described with reference to the drawings, wherein like reference numerals are used to refer to like elements throughout and wherein the illustrated structures are not necessarily drawn to scale. Apparatus and methodologies are provided for signaling or otherwise communicating process or system related information to an operator of a handheld torch in an arc processing system. The invention is hereinafter illustrated and described in the context of welding and plasma cutting systems, although the concepts of the invention are applicable to arc processing systems generally and the invention is not limited to the illustrated embodiments.

Referring initially to FIG. 1A, an exemplary electric arc welding system 10 is illustrated with a handheld torch apparatus 12 and a tactile actuator or tactile device 20 located in a torch handle 14 in accordance with the invention. The exemplary system 10 of FIG. 1A includes a welder 30 arc processing device with a power source 32, a wire feeder 34, and a microprocessor (µP) 36 enclosed within a common housing 38. The welder 30 may further include a supply of process gas 33 for metal inert gas (MIG), tungsten inert gas (TIG) or other welding operations that require shielding gas, and a cooling water system 35 for providing cooling water or other cooling fluid or gas for circulation through inlet and outlet passageways 48a and 48b, respectively, in a torch cable 40 and in the torch 12. The welder 30 may also include a user interface (not shown) operatively coupled with the microprocessor 36, power source 32 and/or with the wire feeder 34 for visually rendering process or welder information to an operator and for receiving input information from the operator. The torch 12 is electrically and mechanically coupled with the welder device 30 via the torch cable 40, which is coupled between the torch handle 14 and the welder housing 38. The cable 40 carries electrical power wiring 42 coupled with the welder power source 32 and also provides a passageway for transfer of welding wire 44 from the wire feeder 34 through the torch 12, as well as a passageway 43 for providing process gas 33 to a welding operation 50. The torch is operative to provide electrical power from the power source 32 through the wiring 42 to an arc processing (welding) operation 50 and transfers welding wire 44 from the wire feeder 34 to the welding operation 50 to create a weldment (not shown) on a workpiece 52.

In the welder device 30, the microprocessor 36 operates to control the power source 32 and the wire feeder 34 according to a welding strategy or configuration, wherein the microprocessor 36 may include or be coupled with an internal or external memory or data store (not shown) within the welder 30 for holding program instructions, control strategy or configuration information, welder status information, weld process information, or the like. Other welders may employ control strategy information obtained from external sources, such as from a user interface, networks, web based services, etc. (not shown), wherein the welder 30 is configurable to provide power from the power source 32 welding wire 44 from the wire feeder 34 to the welding operation 50 via the torch 12 in a controlled fashion. The microprocessor 36 of the welder 30 also provides activating electrical signals to the tactile actuator device 20 according to system or process information via one or more signal wires 46 coupled between the microprocessor 46 and the tactile device 20, or may alternatively signal the tactile device 20 using a wireless (e.g., RF) transmitter 39 in the welder 30 that provides a wireless activating signal 39a to a receiver 15 within the torch handle 14, which in turn provides an electrical activating signal to an activating input 26 of the tactile device 20. The welder 30, moreover, may be of any suitable construction, wherein other logic circuitry, whether programmable or not, may be used for controlled and coordinated operation of the power source 32 and the wire feeder 34 without the need for a microprocessor 36, and/or where the power source 32 and wire feeder 34 may be controlled simply by manual operator adjustments at a user interface (e.g., knobs, switches, etc.) alone or in combination with one or more external manual control devices such as a trigger 16 on the torch handle 14, an operator footswitch (not shown), etc., whereby an operator may perform a welding operation using the system 10.

The power source 32 may be any suitable source of electrical power for use in an arc processing operation (e.g., welding operation 50, plasma cutting operations as discussed below, or other arc processing operations), wherein the exemplary power source 32 is an inverter adaptable or configurable for both welding operations 50 in which high currents and relatively low voltages are applied to the operation 50, as well as plasma cutting operations (e.g., FIG. 1E below) in which relatively low currents and higher voltages are provided. Thus, for example, in an arc welding process 50, the power source 32 may provide AC or DC voltages and current, or combinations thereof, according to any desired arc processing waveforms, amplitudes, frequencies, etc. to the process 50 through the cable 40 and the torch 12. The wire feeder 34 is operable to provide consumable welding wire 44 to the operation 50 through a passageway in the torch 12, and may be controllable with respect to wire feed speed. The wire feeder 34 may include an integral wire supply (not shown) or may feed the wire 44 from an external supply store, which may be within or external to the welder housing 38.

Figure 3A:
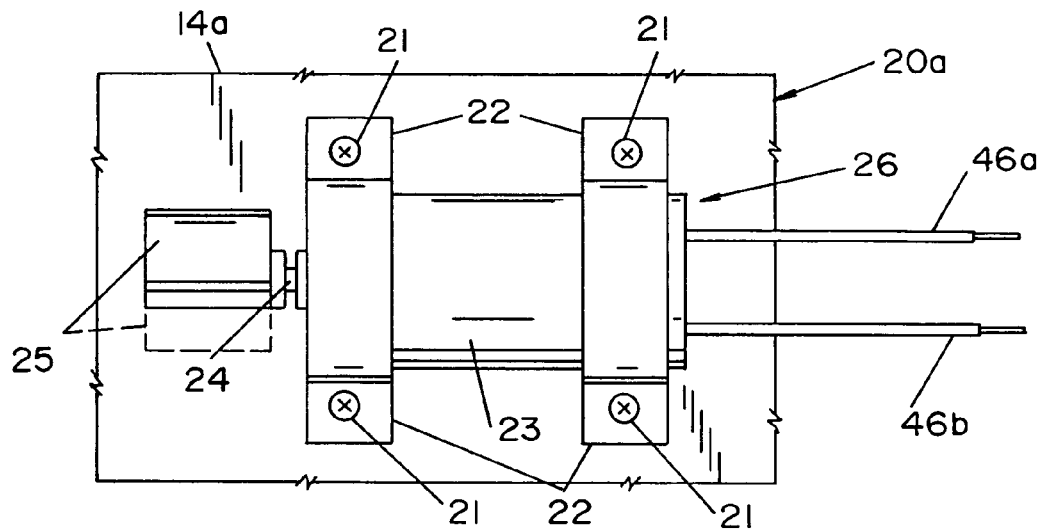
FIGS. 3A and 3B are side and end elevation views, respectively, illustrating an exemplary vibration motor tactile device mounted in a torch handle of an arc processing system according to the invention.
Figure 3B:
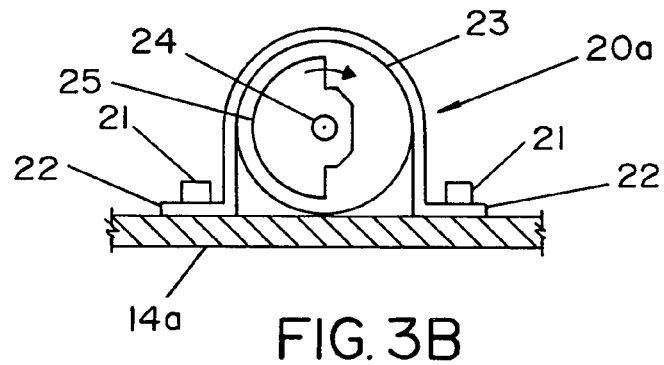
Figure 3C:
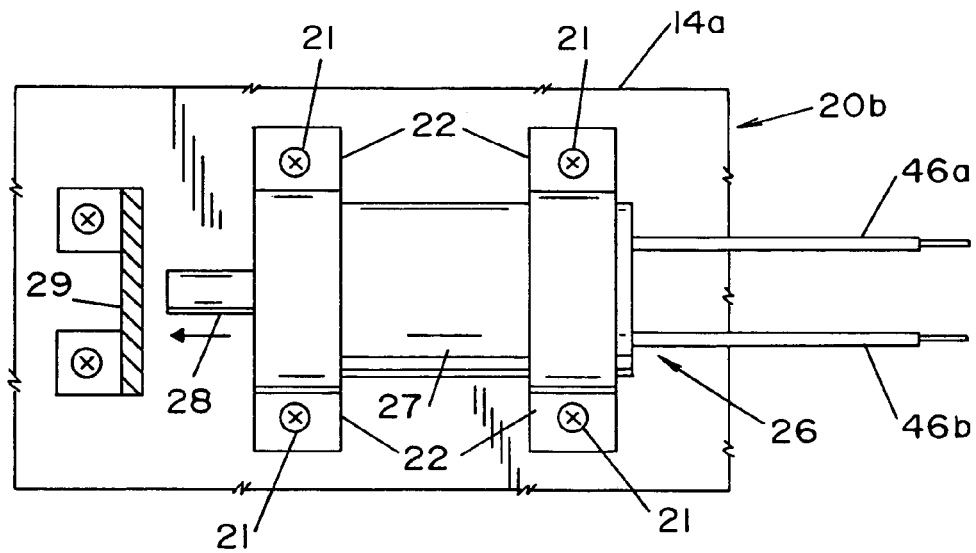
FIG. 3C is a simplified side elevation view illustrating an exemplary solenoid tactile device mounted in a torch handle according to the invention.

Referring also to FIGS. 2A, and 3A-3C, the torch 12 includes the handle 14 with a hanger hook 19 and an operator trigger 16 that is coupled to the welder 30 via the torch cable 40, and an angled neck 17 extending from the handle 14 to a tip 18 near the welding operation 50, wherein the torch cable 40 may be considered part of an overall torch apparatus 12. In accordance with one or more aspects of the invention, the torch apparatus 12 of FIG. 1A comprises a tactile device or actuator 20 (T/A) with an activating input that is responsive to an activating input signal, and the device 20 is mechanically mounted within the torch handle 14 such that activating or energizing the device 20 causes a tactile indication to an operator in physical contact with the torch 12, wherein the welder device 30 provides a signal to the activating input 26 of the tactile device 20 in response to an arc processing condition. FIGS. 3A and 3B illustrate an exemplary vibration motor tactile device 20a and FIG. 3C illustrates an exemplary solenoid type tactile device 20b that may be employed to provide tactile communication to the torch operator, wherein the exemplary tactile devices are collectively referred to herein as tactile device 20. Any tactile actuator device 20 may be used within the scope of the invention which is operable to provide tactile actuation of the torch 12 and thereby to provide a tactile signal or indication to an operator thereof, where the invention and the appended claims are not limited to the illustrated tactile devices 20a and 20b.

The tactile device 20 may be mounted within the torch handle 14 by any suitable fastening or mounting apparatus, for example, such as screws or other threaded fasteners 21 for securing the device 20 to an interior sidewall 14a of the torch handle 14 via mounting tabs 22, as shown in FIGS. 3A-3C. Any suitable mounting may be used within the scope of the invention which affixes the tactile device 20 to, or otherwise mechanically couples the device 20 with, the torch 12 (e.g., including mounting a tactile device 20 to the torch cable 40, or in the welder 30, or elsewhere in the welding system 10, as further illustrated in FIGS. 1B-1D). The vibration motor tactile device 20a of FIGS. 3A and 3B includes a generally cylindrical motor housing 23 with the mounting tabs 22 being integral with the housing 23, as well as a rotating shaft 24 with an unbalanced shaft load structure 25, as well as activating input wires 46a and 46b forming an activating input 26 responsive to an electrical signal from the welder 30. In operation, the vibrating motor 20a responds to a signal on the wires 46 at the activating input 26, and the shaft 24 rotates, wherein the resulting rotation of the unbalanced load 25 causes the vibrating motor device 20a to physically vibrate the sidewall 14a to which it is mounted to thereby provide a tactile vibration of the torch 12 that is discernable to an operator in contact with the torch 12 as a shaking or "buzz" tactile sensation. In this regard, the tactile device 20 may be of any suitable size, power rating, etc., and may be actuated by signals of suitable amplitude, frequency, duration, etc., to provide tactile signaling to a torch operator in a typical operational environment, wherein such design parameters of the tactile device 20 may be selected so as to accommodate situations in which the operator may be wearing gloves during a welding operation.

Another possible tactile actuator device 20b is illustrated in FIG. 3C that may be employed in an arc processing system 10 or torch apparatus 12 thereof in accordance with the present invention. The device 20b is a solenoid device having a housing or body 27 mounted to the torch handle sidewall 14a via integral tabs 22 and fasteners 21. The solenoid device 20b also comprises a linearly movable shaft or actuator member 28 that moves in the direction indicated in FIG. 3B when the device 20b is energized with an activating signal at an activating input 26 via the wires 46a and 46b, wherein the shaft 28 may be spring biased to return to a given position when de-energized. Activation of the input 26 causes the movable shaft 28 to contact a strike plate 29 that is also mounted to the torch handle sidewall 14a. In this manner, activation of the solenoid 20b causes an operator to sense a short duration percussive tactile signal or "click". As with the vibrating motor device 20a above, the solenoid device 20b of FIG. 3B may be of any suitable size, power rating, etc., and may be actuated by signals of suitable duration, amplitude, etc., to provide tactile signaling to a torch operator in a typical operational environment, wherein it is noted that the invention is not limited to any specific type, size, or configuration of tactile device.

In the example of FIG. 1A, the microprocessor 32 in the welder device 30 provides an electrical activating signal on the wires 46 (or through the wireless link 39, 15) to the activating input 26 of the tactile device 20, which in turn provides a tactile message to the torch operator according to the electrical signal from the welder 30. Moreover, as illustrated and described further below with respect to FIGS. 4A-4H, the welder 30 is operable to provide a plurality of electrical signals to the tactile device 20, which are formed into multiple-signal patterns according to a communication protocol, wherein the tactile messaging may include any combination of signaling variations that are distinct or discernable by an operator, including but not limited to different actuation durations, actuation frequencies, actuation amplitudes, or combinations thereof, etc., according to a protocol or other system by which useful information can be rendered to the operator in a tactile fashion. In addition, the torch apparatus 12 may be actuated by a plurality of such tactile devices 20, which are individually mechanically coupled with the torch 12, where the devices 20 are individually adapted to receive an electrical signal and to provide a tactile or signal to an operator. In one possible example, the torch handle 14 may be provided with a vibrating motor 20a for creating buzzing tactile signals along with a solenoid 20b for creating clicking signals, wherein the buzz and click tactile signals may be formed into multiple-signal patterns according to a communication protocol.

Figure 1B:
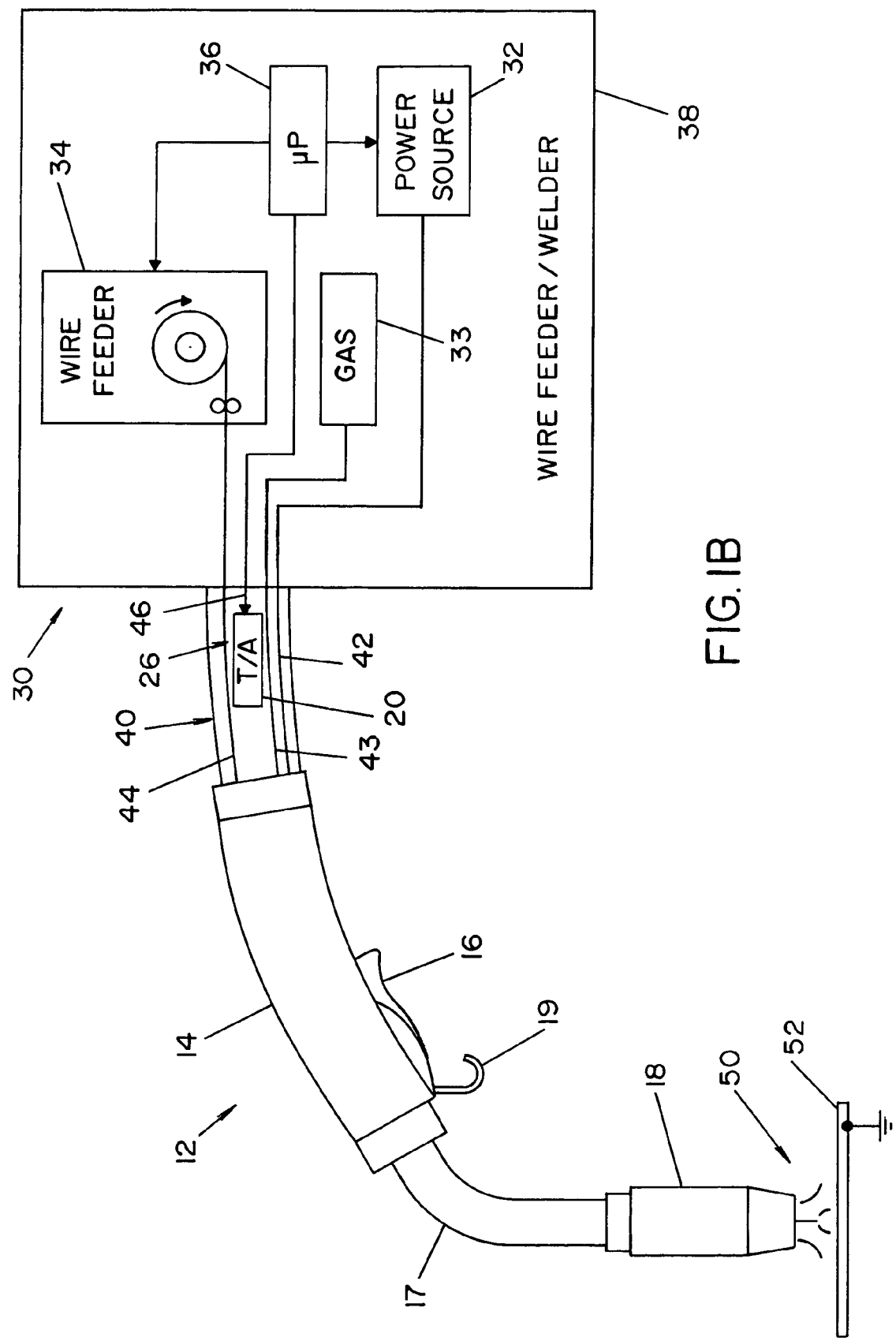
FIG. 1B is a simplified schematic view illustrating another welding system with a tactile device located within a torch cable in accordance with the invention.

Referring now to FIGS. 1A-1D, the tactile device 20 may be located anywhere in the system 10 such that sufficient mechanical coupling is provided between the tactile device 20 and the torch 12 to allow tactile signaling to an operator of the torch 12. As discussed above, the tactile device 20 is mounted within the welding torch handle 14 in the embodiment of FIG. 1A. As illustrated in FIG. 1B, another possible implementation involves mounting or locating a tactile device 20 within the cable 40 that is coupled between the torch 12 and the welder 30, wherein the mechanical coupling of the cable 40 to the torch 12 provides for tactile actuation of the torch handle 14 by the tactile device 20. In this regard, the sizing, power rating, and mounting of the tactile device 20 and/or the signaling provided to the activating input 26 thereof (e.g., frequency, amplitude, duration, timing, etc.) may be designed or selected to account for the mass and other characteristics of a given torch apparatus 12 and torch cable 40, as well as to account for typical operating conditions (e.g., an operator wearing gloves, etc.).

Figure 1C:
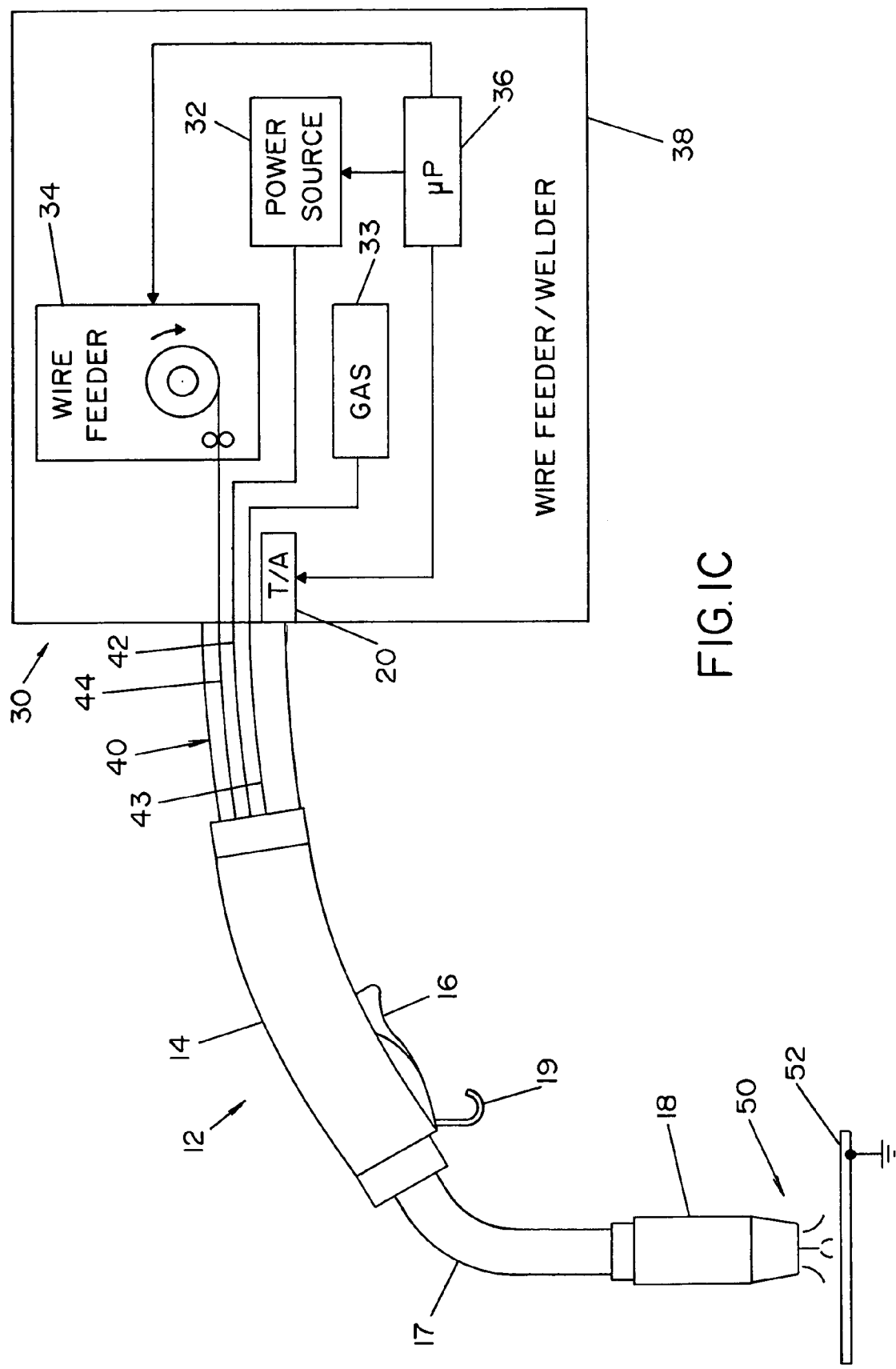
FIG. 1C is a simplified schematic view illustrating yet another exemplary welding system with a tactile device located within the welder housing according to the invention.
Figure 1D:
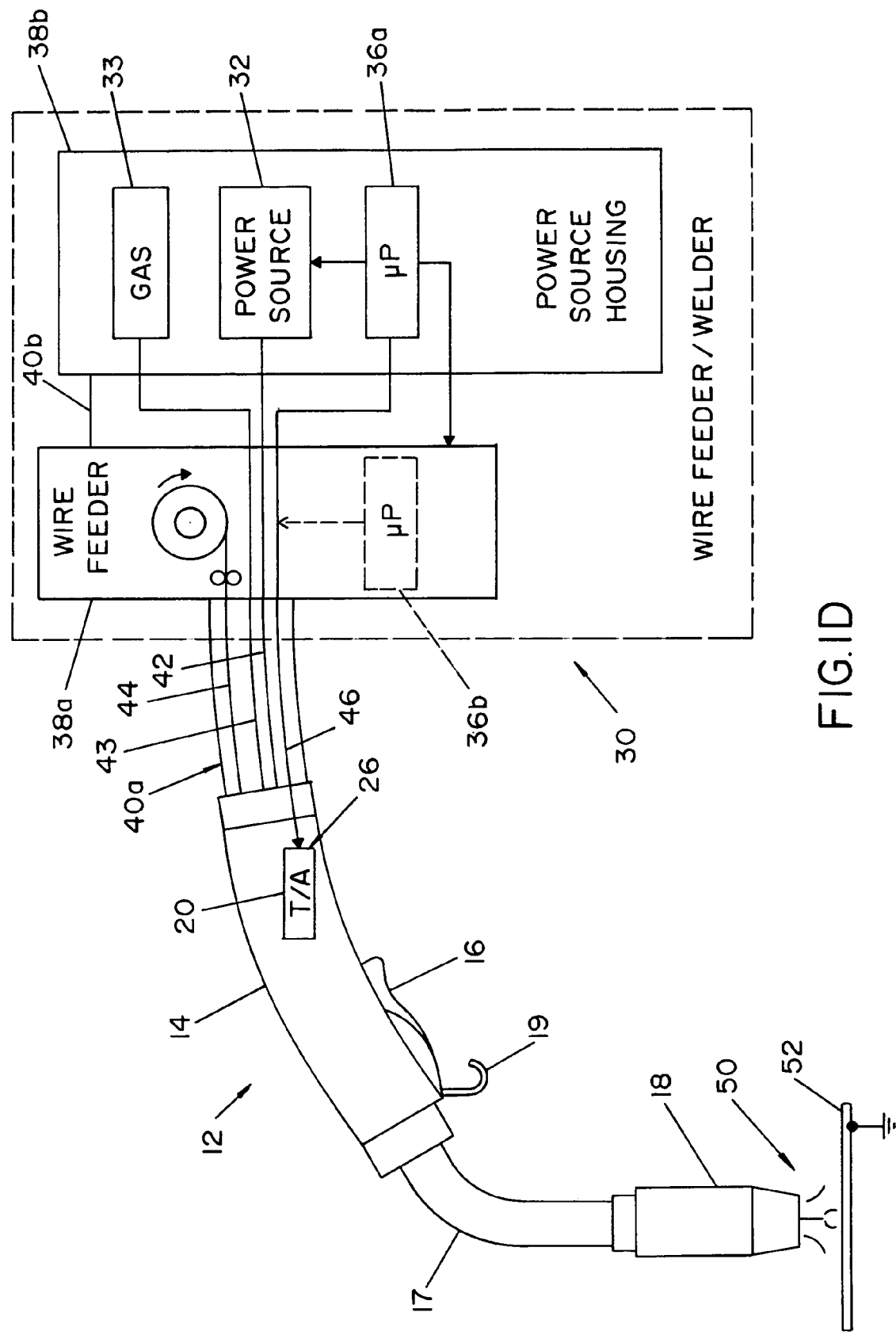
FIG. 1D is a simplified schematic view illustrating another welding system with a separately housed wire feeder and a tactile device located within the torch handle according to the invention.

FIG. 1C illustrates another exemplary implementation of the invention, in which a tactile device 20 is located within the welder housing 38, and is mechanically coupled to the cable 40. Other similar implementations of this concept may be found, for example, in welding systems that provide a torch cable 40 coupled to a power source housing, in which case the tactile device 20 can be mounted or located with the power source housing (e.g., within the power source 32) and is mechanically coupled with the cable 40 such that activation of the tactile device 20 causes tactile actuation of the torch 12. FIG. 1D illustrates another possible embodiment in which the welding system 10 includes two separate housings 38a and 38b for the wire feeder 34 and the power source 32, respectively, with a torch cable 40a extending between the torch handle 14 and the wire feeder housing 38a, and a second system cable 40b extending between the wire feeder and power source housings 38a and 38b, respectively. In this situation, a tactile actuator 20 can be located within the torch handle 14, as shown in FIG. 1D, or may be located in the torch cable 40a (similar to the example of FIG. 1B above), or may be located in the wire feeder housing 38a with suitable mechanical coupling to the torch cable 40a to allow tactile signaling to an operator contacting the torch 12. As also indicated in FIG. 1D, the tactile device 20 may be provided with activating signals from a microprocessor 36a in the power source housing 38b, and/or from a microprocessor 36b within the wire feeder housing 38a, or from other components within the system 10, wherein all such variant or alternative implementations are contemplated as falling within the scope of the invention. The tactile device may thus by located anywhere in an arc processing system with sufficient mechanical coupling between the tactile device 20 and the torch 12 so as to provide tactile signals to the operator, and the system signaling component (e.g., power source or wire feeder microprocessor 36 or other component) may be anywhere in the system, wherein the illustrated embodiments are merely examples and are not exhaustive of all the implementations possible within the scope of the invention.

Figure 1E:
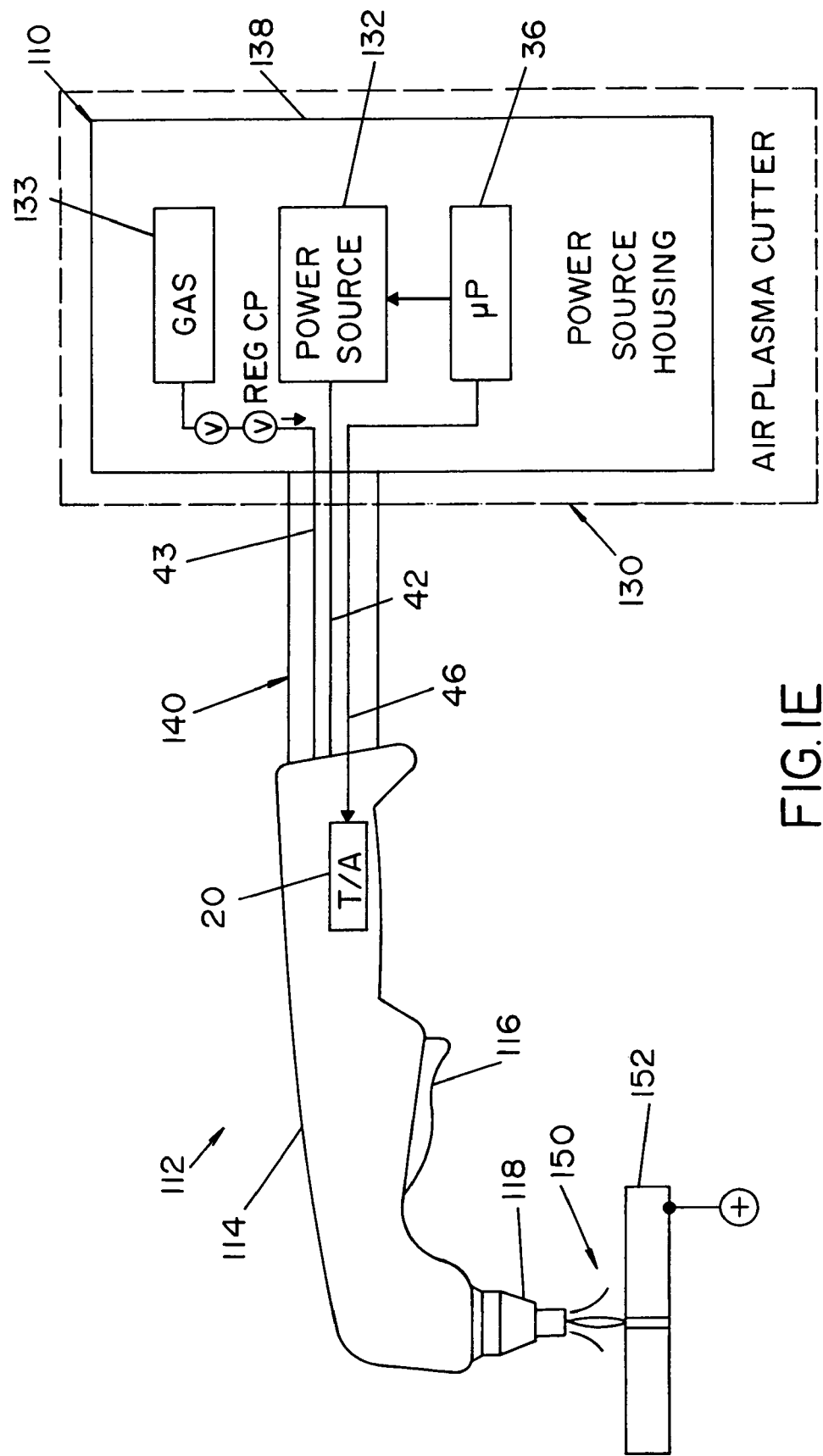
FIG. 1E is a simplified schematic view illustrating an exemplary plasma cutting system with a tactile device located within a cutting torch handle in accordance with the invention.
Figure 2A:
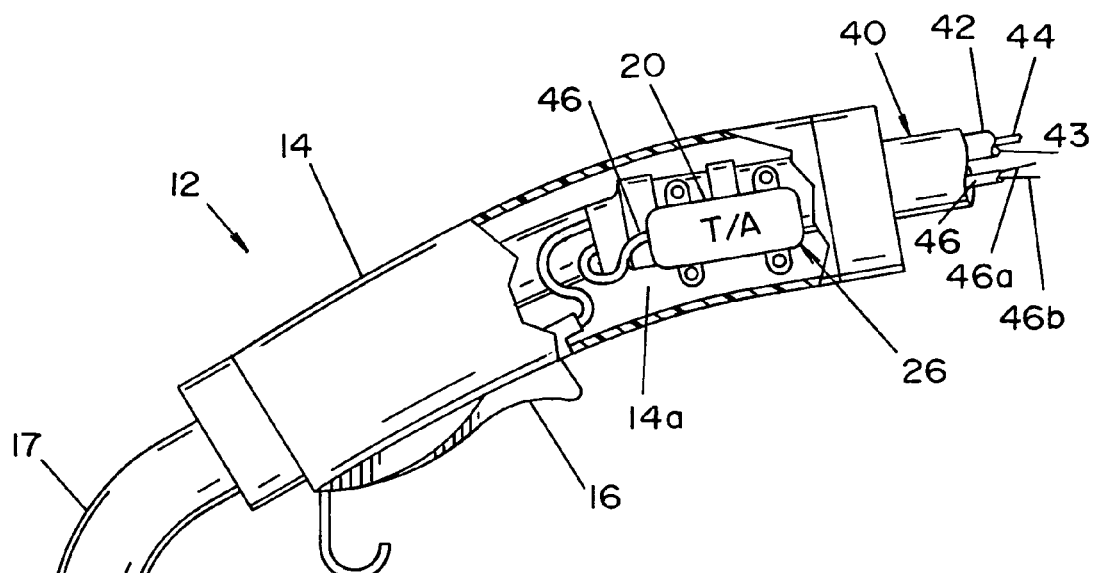
FIG. 2A is a simplified partial sectional side elevation view illustrating an exemplary handheld welding torch apparatus having a tactile actuator device mounted in the torch handle in accordance with another aspect of the invention.
Figure 2B:
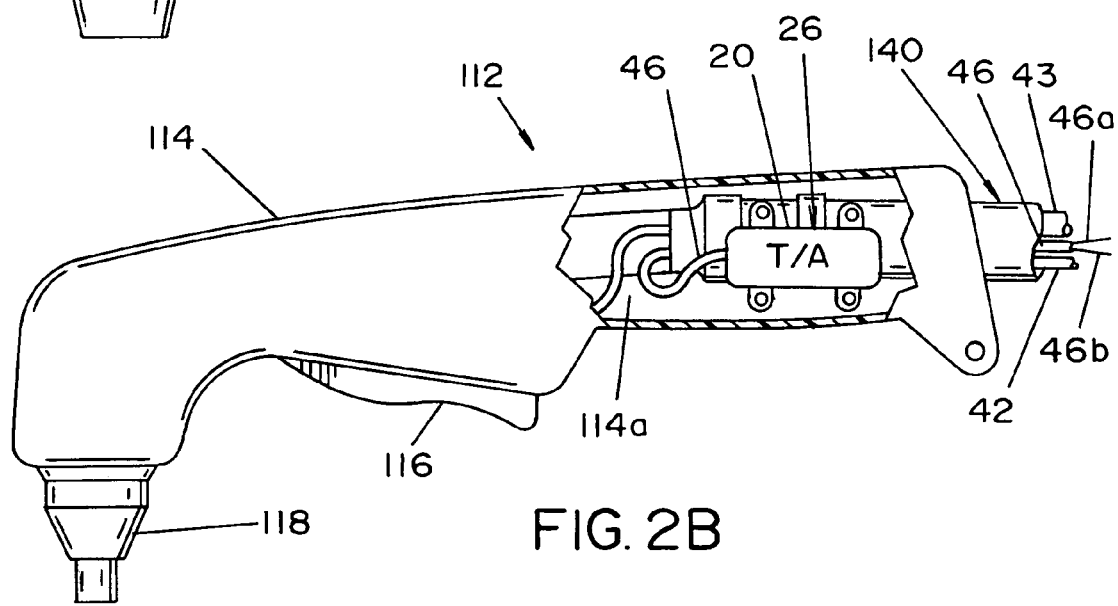
FIG. 2B is a simplified partial sectional side elevation view illustrating an exemplary handheld plasma cutting torch apparatus with a tactile actuator device in the torch handle according to the invention.

Referring now to FIGS. 1E and 2B, as discussed above, the invention may be implemented in the context of welders, plasma cutters, or any other type of arc processing systems. FIG. 1E illustrates an exemplary plasma arc cutting system 110 in accordance with the invention, which comprises a plasma cutter device 130 with a power source 132, a supply of process gas 133, and a microprocessor 36 in a power source housing 138, as well as a tactile device 20 that is mechanically coupled to a plasma cutting torch apparatus 112. While the exemplary plasma cutting system 10 is illustrated in FIG. 1E with a single tactile device 20 located in a cutting torch handle 114, other plasma cutters may be constructed having any number of such tactile devices 20 located anywhere in the system 110 with sufficient mechanical coupling between the tactile device(s) 20 and the torch 112 to allow tactile signaling to an operator in physical contact with the torch 112, wherein all such alternative or variant implementations are contemplated as falling within the scope of the invention and the appended claims. Furthermore, while the exemplary plasma cutter system 110 is shown with the tactile device 20 being provided with activating input signals from the microprocessor 36 through a torch cable 140, other implementations are possible wherein an activating signal is provided by any means from the plasma cutter 130 or any component thereof to the tactile device(s) 20, including but not limited to wireless signaling apparatus or links (e.g., FIG. 1A above), etc.

As best illustrated in FIG. 2B, the exemplary plasma cutting torch apparatus 112 includes the torch handle 114 having and an operator trigger 116 coupled to the plasma cutter 130 via the torch cable 140, and a tip 118 near a plasma cutting operation 150. As in the above welder example, the cutting torch apparatus 112 comprises a tactile device 20 with an input 26 that is responsive to an activating input signal, where the tactile device 20 is mechanically mounted within the torch handle 114 such that signaled activation of the device 20 causes a tactile indication to a torch operator. As in the above welding examples, any suitable type of tactile device 20 may be employed in the plasma cutting system 110 within the scope of the invention, including but not limited to the exemplary vibrating motor 20a and/or solenoid 20b illustrated and described above, wherein the device 20 may be mounted in a mechanically coupled fashion relative to the torch 112 using any suitable means. In operation, the plasma cutter 130 (e.g., the microprocessor 36 thereof in FIG. 1E) provides a signal to the activating input 26 of the tactile device 20 in response to an arc processing condition, and the tactile device 20 provides a corresponding tactile signal to the operator of the torch 112.

In another aspect of the invention, methods are provided for communication in an arc processing system by conveying tactile information from an arc processing device of the system to an operator. While the methods of the invention may be described herein as a series of acts or events, it will be appreciated that the present invention is not limited by the illustrated ordering of such acts or events. For example, some acts may occur in different orders and/or concurrently with other acts or events apart from those described herein, in accordance with the invention. Furthermore, not all illustrated steps may be required to implement a methodology in accordance with the present invention. In addition, the methods of the present invention may be implemented in association with the arc processing devices, systems, and system components illustrated and described herein as well as in association with others not illustrated. The methods of the invention comprise generating a signal in an arc processing device according to information related to one or more arc processing conditions (e.g., information regarding an arc processing device and/or an arc processing operation being performed). The signal is provided to a tactile device that is mechanically coupled to a handheld torch in the system, and a tactile message is generated to an operator of the torch according to the signal. The signal generation may comprise generating a plurality of electrical signals formed into a multiple-signal pattern according to a communication protocol, with the tactile message comprising a plurality of tactile signals formed into a corresponding multiple-signal tactile pattern. In this regard, the multiple-signal pattern may comprise a plurality of distinct signals.

Referring now to FIGS. 1A and 4A-4H, the activating input signal(s) and the resulting tactile signals of the plasma processing systems 10, 110 may be indicative of any arc processing condition, which may be any information useful to an operator regarding an arc processing operation (e.g., welding operation 50, plasma cutting operation 150) and/or relating to the arc processing device, such as status or conditions of a system component or consumable supply in the arc processing system (e.g., power supply conditions or status, wire feeder status, gas supply status), and/or configuration information relating to programmable or selectable operational strategies (e.g., power source waveform control, wire feed speed, batch processing parameters, timing signals, etc.), wherein the information may be obtained from system components (e.g., from a power source, wire feeder, etc.) and/or from external sources (e.g., networks, web based systems, etc.). In this regard, the arc processing device (e.g., welder 30, plasma cutter 130, or subsystems or components thereof, etc.) may be operable to provide a plurality of electrical signals to the tactile device(s) 20, and the tactile device(s) 20 provides one or more tactile messages as a corresponding plurality of tactile signals to the operator according to the electrical signals, wherein the electrical signals and tactile signals may be formed into multiple-signal patterns according to a communication protocol. In this regard, the multiple-signal patterns may comprise a plurality of distinct signals of differing discernable amplitude, frequency, duration, etc., to provide tactile signaling to a torch operator.

Figure 4A:
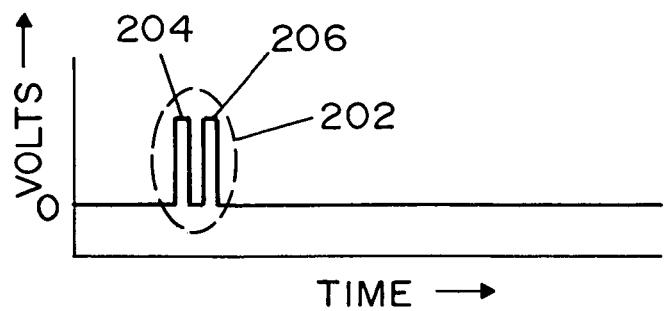
FIGS. 4A-4H are graphs illustrating several exemplary activating input signals formed into single or multiple-signal patterns according to a communication protocol in accordance with the invention.

FIG. 4A illustrates one possible electrical signal pattern 202 comprising two short-duration electrical voltage activating signals 204 and 206 applied to the tactile device 20 (e.g., either directly or via a wireless transmission/reception link as in FIG. 1A), in which the two exemplary signals 204 and 206 are of generally equal amplitude with a short pause therebetween, wherein the corresponding tactile signal pattern to the operator would be in the form of two short buzzes (e.g., for a vibrating motor device 20a as in FIGS. 3A and 3B above) or two clicks (for a solenoid type tactile device 20b as in FIG. 3C). This multiple-signal pattern 202 in FIG. 4A is distinguishable by an operator from a three-signal pattern 212 shown in FIG. 4B, comprising short-duration signals 214, 216, and 218 closely spaced in time. FIG. 4C illustrates still another unique and easily discernable signal or signal pattern 222 including a single short-duration pulse 224, and FIG. 4D shows a unique signal pattern 232 consisting of a single relatively long-duration pulse 234, wherein the signal patterns 202, 212, 222, and 232 of FIGS. 4A-4D, respectively, are of generally equal amplitude (e.g., electrical signal voltage level).

In the case of a single vibrating motor tactile device 20a (FIGS. 3A and 3B), the number of electrical pulse signals and the duration thereof may be varied, for example, as shown in FIGS. 4A-4D, to create the distinct signal patterns 202, 212, 222, and 232 to signal the torch operator with one or more short and/or long buzz-type tactile signals individually representing different or unique conditions associated with the arc processing system and/or the arc processing operation. In another possible implementation, two separate and different tactile devices 20 may be mechanically coupled with the torch 12, 112, such as a vibrating motor 20a (FIGS. 3A and 3B) and a solenoid 20b (FIG. 3C), wherein the vibrating motor 20a is actuated with long or short electrical pulses to create buzz tactile torch actuations, and the solenoid 20b is provided with short electrical pulse signals to provide click-type tactile torch actuations. In this case, the signals 202, 212, and 222 may be provided to the solenoid to create single or multiple-signal click patterns (FIGS. 4A-4C) and the vibrating motor 20a is provided with a somewhat longer single-pulse signal pattern 232 (FIG. 4D) to create a long buzzing tactile signal to the operator.

Figure 4B:
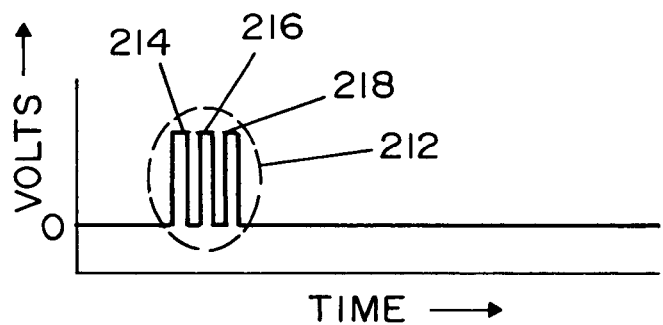
Figure 4C:
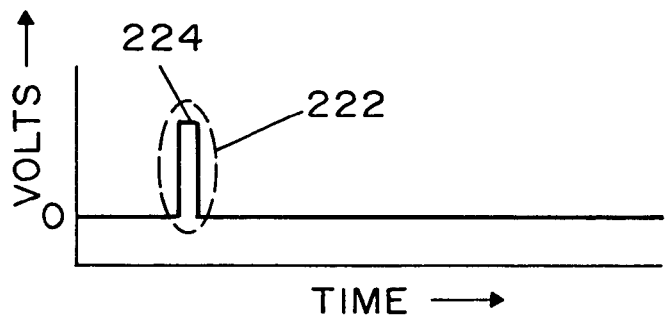

In one possible protocol, the signal patterns of FIGS. 4A-4C and other similar configurations of short pulse signals may be employed to indicate a memory or program currently selected in the arc processing system, for instance, where the number of electrical pulses in the pattern is indicative of the program currently selected in a semi-automatic welder. In this case, the number of clicks or short buzzing sensations received by the operator indicates the program selection without the operator having to divert his or her attention away from a welding operation, wherein such signaling can be provided to the operator periodically, or after the program selection has been changed using a footswitch or by other means, or according to any suitable protocol which the operator will understand.

Figure 4D:
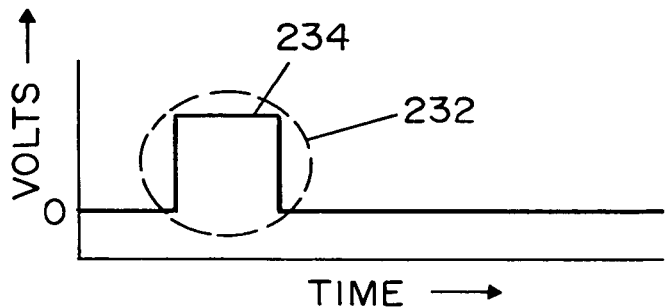

The longer signal pattern 232 of FIG. 4D and similar longer signals may be provided to indicate other conditions to the operator, for example, such as power source warnings relating to voltage levels, current levels, overall power levels, thermal power source conditions, the onset of a thermal power source shut down, etc., wherein the duration of the electrical pulses may be varied to provide distinguishable messages to the operator. In one possible implementation, a short buzz (e.g., or a click) may be employed to indicate a power source thermal overload warning and a longer buzz may indicate a thermal overload fault and/or the onset of a thermal power source shut-down sequence.

Figure 4E:
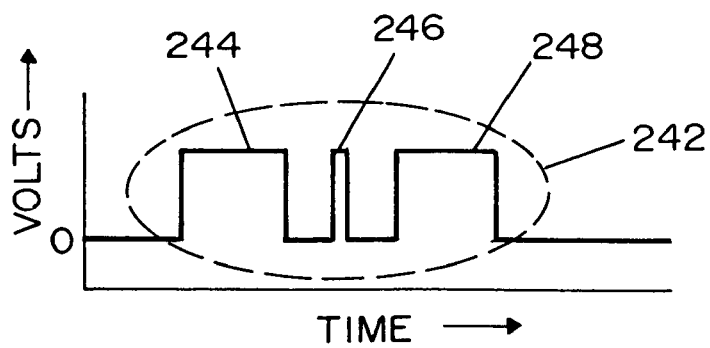
Figure 4F:
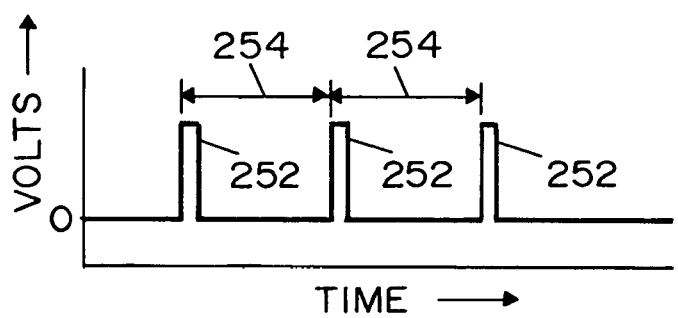

FIG. 4E provides another example of a suitable multi-signal pattern 242 that includes a long pulse 244, followed by a short pulse 246 and another long pulse 248 to create a "buzz"-"click"-"buzz" tactile sensation at the torch 12. This pattern 242 may be used, for example, to indicate a water cooler fault, such as where the cooling water supply 35 is low and/or where the coolant passageways 48 are restricted in the welder 30, the cable 40, or the torch 12 (FIG. 1A). As shown in FIG. 4F, tactile messaging may also be employed to provide periodic interval timing signals to the operator, wherein short pulses 252 of generally equal amplitude and duration are provided, which are spaced in time by a generally equal period 254. This communication technique may be employed to provide an operator with timing references, for example, to construct a series of repetitive welds of similar construction, or to alert the operator of timing signals being used in a semi-automatic welder by which the welder operator is automatically changed in a periodic manner, or any other situation in which it is desirable to indicate a particular timing reference to the operator.

Figure 4G:
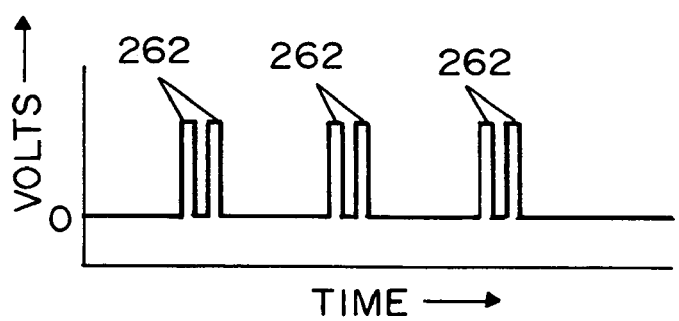
Figure 4H:
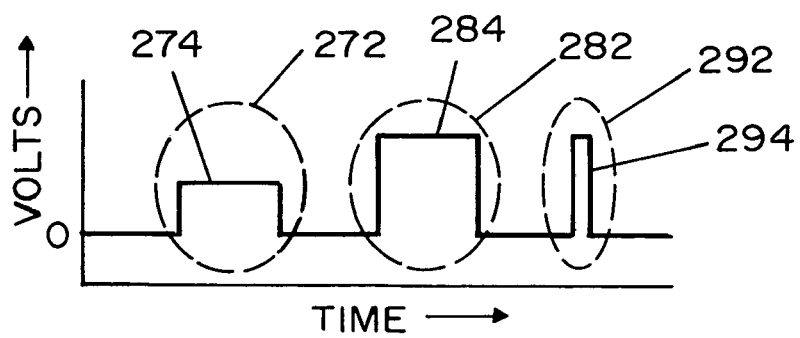

FIG. 4G illustrates another example of a semi-repetitive stream of signal patterns, wherein two short pulses 262 are provided to the tactile device 20 followed by a pause, after which the pattern repeats. This signal pattern may be employed, for instance, to indicate a wire shortage warning, wherein the supply of consumable welding wire 44 is running low. As another possible example, FIG. 4H illustrates the use of different signal amplitudes and pulse durations, which may be employed separately or in combination with variations in the number and spacing of pulse signals according to a communication protocol. As illustrated in FIG. 4H, single-signal patterns 272, 282, and 292 may be created by providing a long pulse signal 274 of a first amplitude, a long pulse 284 of a second higher amplitude, and a short pulse 294 of the second amplitude, where the signals 272, 282, and 292 may separately be used to indicate information to the operator or may be combined to form a multiple-signal pattern indicating of information related to the arc processing system or operation. The above examples are merely illustrative of a small number of possible signals, patterns, and messages created according to a communication protocol, and are not exhaustive of the possibilities falling within the scope of the invention.

While the invention has been illustrated and described hereinabove with respect to one or more exemplary implementations, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in the detailed description and/or in the claims, such terms are intended to be inclusive in a manner similar to the term "comprising."

Having thus described the invention, the following is claimed:

1. An electric arc processing system, comprising:
   an arc processing device having a power source to provide electrical power for an arc processing operation;
   a torch coupled with the arc processing device to provide power from the power source to the arc processing operation; and
   a tactile device coupled to the torch, the tactile device comprising an activating input responsive to a signal; wherein the arc processing device provides the signal to the activating input of the tactile device in response to a selected arc processing condition;
   wherein said tactile device is located within a cable that is coupled between said torch and said arc processing device.

2. An electric arc processing system, comprising:
   an arc processing device having a power source to provide electrical power for an arc processing operation;

a torch coupled with the arc processing device to provide power from the power source to the arc processing operation; and a tactile device coupled to the torch, the tactile device comprising an activating input responsive to a signal; wherein the arc processing device provides the signal to the activating input of the tactile device in response to a selected arc processing condition;

wherein said tactile device is located within said arc processing device and is mechanically coupled to a cable that is coupled between said torch and said arc processing device; and wherein the tactile device is located within said power source.

3. An electric arc processing system, comprising:

an arc processing device having a power source to provide electrical power for an arc processing operation;

a torch coupled with the arc processing device to provide power from the power source to the arc processing operation; and a tactile device coupled to the torch, the tactile device comprising an activating input responsive to a signal; wherein the arc processing device provides the signal to the activating input of the tactile device in response to a selected arc processing condition;

wherein said tactile device is located within said arc processing device and is mechanically coupled to a cable that is coupled between said torch and said arc processing device; and wherein said arc processing device is a welder comprising said power source and a wire feeder, and wherein said tactile device is located within the wire feeder and is mechanically coupled to a cable that is coupled between said torch and said wire feeder.

4. The system of claim 3, wherein the power source provides the signal to the activating input of the tactile device in response to a welder or welding process condition.

5. The system of claim 3, wherein the wire feeder provides the signal to the activating input of the tactile device in response to a welder or welding process condition.

6. The system of claim 3, wherein said arc processing device is a welder.

7. The system of claim 3, wherein said arc processing device is a plasma cutter.

8. The system of claim 3, wherein said tactile device is a vibration motor.

9. The system of claim 3, wherein said tactile device is a solenoid.

10. The system of claim 3, wherein said arc processing condition is a condition associated with at least one of said arc processing device and the arc processing operation.

11. The system of claim 3, wherein said arc processing device comprises a transmitter to transmit said signal to said tactile device.

12. The system of claim 3, wherein said arc processing device is operable to provide an electrical signal to said activating input of said tactile device, and wherein said tactile device provides a tactile message to an operator of said torch according to said electrical signal from said arc processing device.

13. The system of claim 12, wherein said arc processing device is operable to provide a plurality of electrical signals to said tactile device, wherein said tactile device provides said tactile message as a corresponding plurality of tactile signals to the operator according to said electrical signals from said arc processing device, and wherein said electrical signals and tactile signals are formed into multiple-signal patterns according to a communication protocol.

14. The system of claim 13, wherein at least one of said multiple-signal patterns comprises a plurality of distinct signals.

15. The system of claim 3, comprising a plurality of tactile devices mechanically coupled with said torch handle, said tactile devices individually comprising an activating input responsive to an electrical signal and being individually adapted to provide a tactile signal to an operator of said torch according to said electrical signal from said arc processing device.

16. A handheld torch apparatus for use in performing an arc processing operation, the handheld torch apparatus comprising: a torch handle; a cable coupled to said torch handle for connecting the torch apparatus to a power source of an arc processing device to receive power from the power source for powering the arc processing operation; and a tactile device mechanically coupled with said torch handle, said tactile device comprising an activating input responsive to a signal, and said tactile device being adapted to provide a tactile signal to an operator of the torch apparatus according to said signal, wherein said tactile device is located within said cable.

17. The handheld torch apparatus of claim 16, wherein said tactile device is a vibration motor.

18. The handheld torch apparatus of claim 16, wherein said tactile device is a solenoid.

19. The handheld torch apparatus of claim 16, comprising a plurality of tactile devices mechanically coupled with said torch handle, said tactile devices being individually adapted to receive an electrical signal and to provide a tactile message to an operator of the torch apparatus according to said electrical signal.

* * * * *